United States Patent
Velusamy et al.

(10) Patent No.: US 11,540,346 B1
(45) Date of Patent: Dec. 27, 2022

(54) USE OF THRESHOLD RAB-MODIFICATION RATE AS BASIS TO CONTROL CONFIGURATION OF DUAL CONNECTIVITY

(71) Applicant: Sprint Spectrum L.P., Overland Park, KS (US)

(72) Inventors: Saravana Velusamy, Overland Park, KS (US); Mohammed Samiuddin, Plano, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 29 days.

(21) Appl. No.: 16/849,778

(22) Filed: Apr. 15, 2020

(51) Int. Cl.
*H04W 76/15* (2018.01)
*H04W 76/22* (2018.01)
*H04W 92/10* (2009.01)
*H04W 92/04* (2009.01)

(52) U.S. Cl.
CPC ........... *H04W 76/22* (2018.02); *H04W 76/15* (2018.02); *H04W 92/045* (2013.01); *H04W 92/10* (2013.01)

(58) Field of Classification Search
None
See application file for complete search history.

(56) References Cited

U.S. PATENT DOCUMENTS

| 9,820,297 | B2 | 11/2017 | Huang et al. | |
|---|---|---|---|---|
| 9,973,951 | B1 | 5/2018 | Rai et al. | |
| 2013/0102343 | A1* | 4/2013 | Shaw | H04L 12/28 455/509 |
| 2013/0117842 | A1* | 5/2013 | Kakadia | H04W 24/08 370/252 |
| 2013/0155959 | A1* | 6/2013 | Ikeda | H04W 36/14 370/328 |
| 2014/0274063 | A1 | 9/2014 | Singh et al. | |
| 2015/0029841 | A1* | 1/2015 | Takayanagi | H04L 43/0888 370/230 |
| 2015/0181639 | A1* | 6/2015 | Liu | H04W 76/18 370/329 |
| 2016/0021585 | A1 | 1/2016 | Pedersen et al. | |
| 2016/0262149 | A1* | 9/2016 | Futaki | H04W 24/10 |
| 2016/0338130 | A1* | 11/2016 | Park | H04W 76/15 |
| 2017/0013668 | A1* | 1/2017 | Chang | H04W 76/22 |
| 2018/0132129 | A1* | 5/2018 | Sitomaniemi | H04W 76/34 |
| 2018/0206113 | A1 | 7/2018 | He et al. | |

(Continued)

OTHER PUBLICATIONS

U.S. Appl. No. 15/929,202, filed Jan. 9, 2020.

*Primary Examiner* — The Hy Nguyen (57) ABSTRACT

A method and system to help address excessive RAB-modification requests as may happen when a UE is connected with and served by a first access node and the first access node repeatedly configures and de-configures dual connectivity for the UE where the UE would be connected with and served concurrently by the first access node and a second access node, with each configuring and de-configuring including a RAB-modification request to transfer a RAB of the UE between being anchored at the first access node and being anchored at a second access node. A computing system could detect that the rate of such RAB-modification requests is at least predefined threshold high and could cause the requests to be discontinued, such as by causing the first access node to at least temporary stop sending such requests.

20 Claims, 4 Drawing Sheets

(56) References Cited

U.S. PATENT DOCUMENTS

| | | | |
|---|---|---|---|
| 2018/0213450 A1* | 7/2018 | Futaki | H04W 36/08 |
| 2018/0255488 A1* | 9/2018 | Kim | H04W 76/16 |
| 2018/0359660 A1* | 12/2018 | Konappa | H04L 65/1104 |
| 2020/0059990 A1* | 2/2020 | Wigard | H04W 76/36 |
| 2020/0137640 A1* | 4/2020 | Futaki | H04B 7/024 |
| 2020/0288539 A1* | 9/2020 | Qu | H04W 76/19 |
| 2020/0359424 A1* | 11/2020 | Shi | H04B 7/0695 |
| 2021/0051749 A1* | 2/2021 | Adusumilli | H04W 76/20 |
| 2021/0153078 A1* | 5/2021 | Condoluci | H04M 15/66 |
| 2021/0219149 A1* | 7/2021 | Huang | H04W 76/15 |

* cited by examiner

USE OF THRESHOLD RAB-MODIFICATION RATE AS BASIS TO CONTROL CONFIGURATION OF DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, the air interface on each carrier could be structured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in random-access and Radio Resource Control (RRC) signaling with the access node to establish an RRC connection between the UE and the access node, thus putting the UE in an RRC-connected mode.

Further, if appropriate, the UE could engage in attach signaling via the access node with a core-network controller to attach and thus register for service, and the core-network controller could coordinate setup for the UE of one or more user-plane bearers each defining a packet tunnel for carrying data between the UE and a core-network gateway system that provides connectivity with a transport network. In addition, the access node could establish a context record for the UE's RRC connection and could record in the context record an indication of the existence of each bearer established for the UE.

Each such bearer could include at least a radio access bearer (RAB) portion that is anchored at the access node to facilitate user-plane communication between the access node and the UE and communication between the access node and the core-network gateway system. Without limitation, for instance, the RAB could include an S1 user-plane (S1-U) packet tunnel that extends within the core network between the access node and the core-network gateway system and a data-radio bearer (DRB) packet tunnel that extends over the air between the access node and the UE. To facilitate setup of each such bearer for the UE, the core-network controller might engage in signaling with both the core-network gateway system and the access node to set up an S1-U tunnel extending between a tunnel-endpoint (e.g., port) at the core-network gateway system and a tunnel-endpoint (e.g., port) at the access node, and the access node might engage in signaling with the UE to set up an associated DRB extending between the access node and the UE.

Once the UE is connected and attached, with one or more such bearers established, the access node could then serve the UE with packet-data communications.

For instance, when the transport-network gateway receives packet-data for transmission to the UE, the data could flow to the access node serving the UE, and the access node could buffer the data, pending transmission of the data to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet-data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry at least some of the data from the UE and could transmit to the UE a scheduling directive indicating those upcoming PRBs, and the UE could transmit the data to the access node in those PRBs.

When the industry advances from one generation of wireless technology to the next, or in other scenarios, networks and UEs may also support dual-connectivity service, where a UE is served on co-existing connections according to multiple different RATs.

For instance, a cellular wireless network could include a first access node that provides coverage and service according to a first RAT (first-RAT access node) and a second access node that provides overlapping coverage and service according to a second RAT (second-RAT access node), and a UE positioned within coverage of the access nodes could have a first radio configured to engage in service according to the first RAT and a second radio configured to engage in service according to the second RAT. With this arrangement, the UE may be able to establish a first air-interface connection with the first-RAT access node according to the first RAT (first-RAT connection) and a second air-interface connection with the second-RAT access node according to the second RAT (second-RAT connection), and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT connection between the UE and the MN. Further, if appropriate, the UE could engage in attach signaling with a core-network controller via the MN, and the core-network controller and MN could coordinate establishment for the UE of at least one user-plane bearer as discussed above. The MN could then serve the UE in a standalone mode with packet-data communications in the manner described above.

In addition, once the UE is connected with the MN and is attached with the core network, the MN could engage in a process to coordinate setup of dual connectivity for the UE, so that the UE can be served concurrently by the MN and the SN.

To do so, the MN could first transmit to the UE a "B1" (inter-RAT) measurement object that would cause the UE to scan for coverage of the SN under the second RAT and to report to the MN if and when the UE detects at threshold strong coverage of the SN. And when the MN receives from the UE a measurement report indicating that the UE is in threshold strong coverage of the SN, the MN could then engage in an SN-addition process to add for the UE a second-RAT connection with the SN, so that the MN and SN can then cooperatively provide the UE with dual-connectivity service over their respective connections with the UE.

In an example SN-addition process, for instance, the MN could transmit to the SN an SN-addition request message, providing RRC and DRB configuration information and other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, in a representative SN-addition process, the MN could also engage in a path update procedure as to at least one user-plane bearer established for the UE, to transfer the bearer from being anchored at the MN to being anchored instead at the SN. For instance, the MN could include in its SN-addition request to the SN information about the RAB, and the MN could transmit to the core-network controller a RAB-modification request that requests this transfer. And the core-network controller could responsively engage in signaling to transfer the S1-U tunnel from extending between the core-network gateway system the MN to instead extend between the core-network gateway system the SN.

Once dual connectivity is set up for the UE, the MN and SN could then each serve the UE respectively in the manner discussed above, with some user-plane data also flowing between the MN and SN to facilitate routing of MN-served data over the S1-U tunnel that is anchored at the SN.

For instance, when the core network has data for transmission to the UE, that data could flow over the S1-U tunnel to the SN and (ii) the SN could schedule and provide transmission of some of the data to the UE over the UE's second-RAT connection and (ii) the SN could send other of the data over an inter-access-node interface, such as an X2 interface, to the MN, and the MN could schedule and provide transmission of that data to the UE over the UE's first-RAT connection. And when the UE has data to transmit, (i) the SN could schedule and the UE could provide transmission of some of the data to the SN over the UE's second-RAT connection, and the SN could forward that data over the S1-U tunnel to the core-network gateway system, and (ii) the MN could schedule and the UE could provide transmission of other of the data to the MN over the UE's first-RAT connection, the MN could forward that data over an inter-access-node interface to the SN, and the SN could forward the data over the S1-U tunnel to the core-network gateway system.

While the UE is so served with dual connectivity, as noted above, the MN may also control whether and when to de-configure the UE's dual connectivity and to thus transition the UE back to standalone first-RAT connectivity. The MN may so de-configure the UE's dual connectivity in response to any of various triggers. By way of example, if the UE receives threshold weak or poor-quality communication from the SN, the UE could report that fact to the MN, and/or if the SN receives threshold weak or poor-quality communication from the UE, the SN could report that fact to the MN. The MN could treat these or other reports as triggers for de-configuring the UE's dual connectivity, among other possibilities.

To de-configure the UE's dual connectivity, the MN could effectively reverse the dual-connectivity configuration process described above. For instance, the MN could transmit to the core-network controller a RAB-modification request requesting transfer of the UE's S1-U tunnel back to be anchored at the MN, and the core-network controller could accordingly engage in signaling to effect that transfer. Further, the MN could engage in signaling with the SN and the UE to tear down the UE's second-RAT connection. And the MN could then proceed to provide the UE with standalone first-RAT service.

One technical issue that can arise in a system that supports dual-connectivity service is that, in some situations, a UE may repeatedly transition back and forth, i.e., ping-pong, between dual connectivity and standalone connectivity.

For instance, each time the UE is served with standalone first-RAT connectivity by the MN, the MN may direct the UE to scan for coverage on the second RAT, the UE may responsively discover and report threshold strong coverage of the SN, and the MN may responsively engage in a process as discussed above to configure dual connectivity for the UE. But each time the UE is served with dual connectivity by the MN and SN, quality or strength of the UE's second-RAT connection with the SN may become threshold poor to the point that the MN will responsively engage in a process as discussed above to de-configure the UE's dual connectivity, returning the UE to standalone first-RAT connectivity.

This ping-ponging between dual connectivity and standalone connectivity could occur for various reasons. Without limitation, for instance, RF interference on the UE's second-RAT connection could be fluctuating, perhaps due to the UE being at a cell edge and/or due to changes in the UE's environment. Other reasons could exist as well.

Unfortunately, this ping-ponging could have a detrimental impact on user experience, on UE operation, and on network operation. As to user-experience, for instance, the ping-ponging could result in a user of the UE experiencing inconsistent data throughput and perceiving the UE alternating between dual connectivity and standalone connectivity (perhaps with the UE switching on and off a dual-connectivity display icon). As to UE operation, the ping-ponging could result in increased battery drain resulting from the UE engaging in signaling and processing to switch between dual connectivity and standalone connectivity. And as to network operation, the ping-ponging may result in increased control-plane-signaling load in the network, related to processing each instance of setup or teardown of the UE's dual connectivity.

The present disclosure provides a mechanism to help address this technical issue. In accordance with the disclosure, a computing system will detect that there has been at least a predefined threshold high rate of RAB-modifications transferring the UE's RAB (e.g., S1-U tunnel) back and forth between the MN and the SN. And in response, the computing system will then send direct the MN to discontinue transmitting to the core-network controller RAB-modification requests requesting transfer of the UE's RAB between the MN and the SN.

In an example implementation, the computing system could be provided at the core-network controller or at an element management system (EMS) or the like and, upon detecting the threshold high rate of the RAB-modifications, could transmit to the MN a directive to which the MN is configured to respond by discontinuing sending of further such RAB-modification requests for the UE. Alternatively, the computing system could be provided at the MN and, upon detecting the threshold high rate of the RAB-modifications, could directly set the MN to discontinue sending further such RAB-modification requests for the UE.

This responsive discontinuation of sending RAB-modifications to transfer the UE's RAB between the MN and the SN could be temporary. For instance, the discontinuation could be for a predefined period of time and/or just for as long as the UE remains connected with the MN, among other possibilities.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) functions as the first access node, and a 5G access node (5G next-generation Node-B (gNB)) functions as the second access node. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
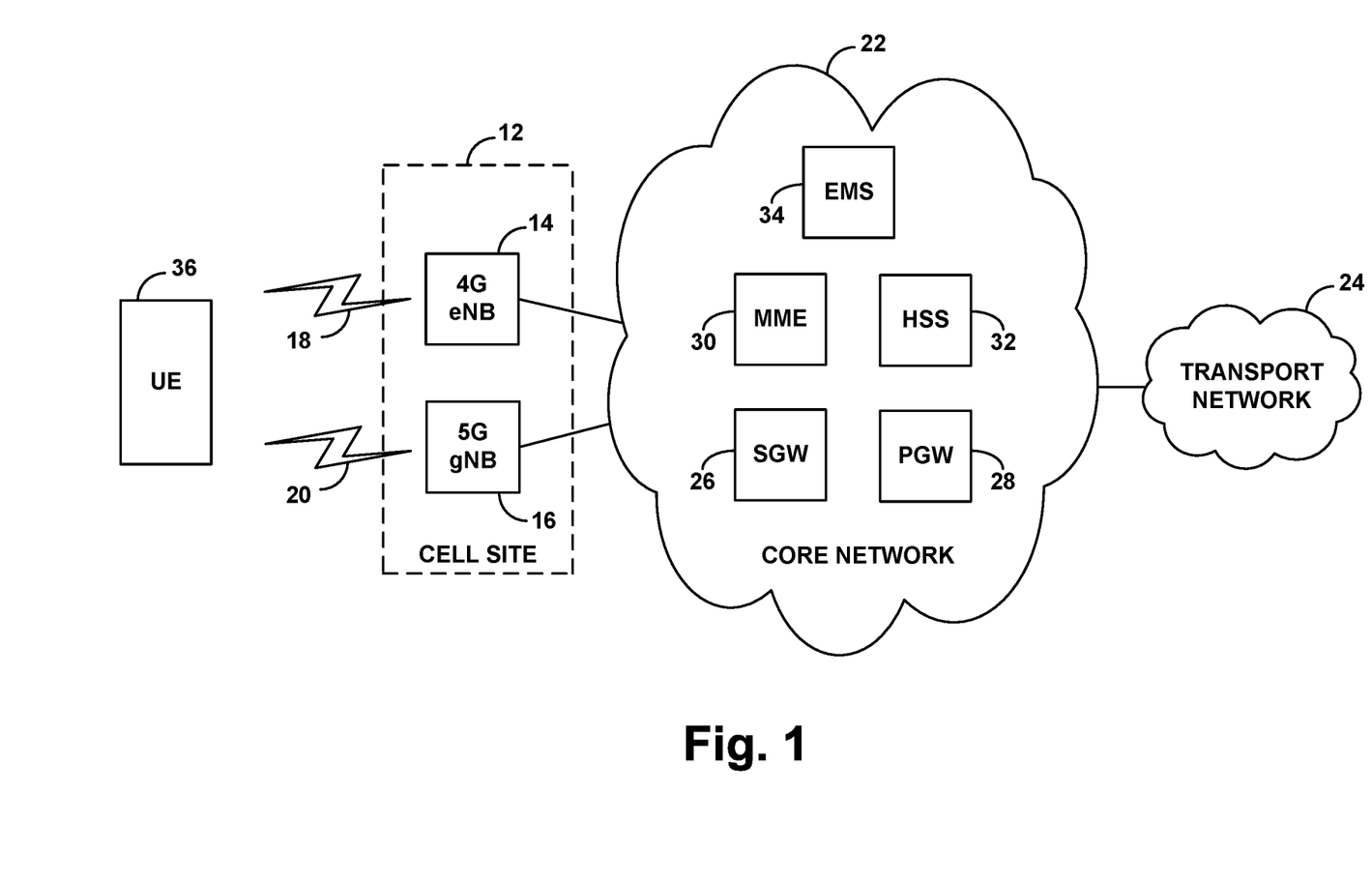
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage. The access nodes could also be different types than each other. And in an alternative arrangement, the access nodes could be located at different cell sites.

Each access node could have a respective antenna structure and could be configured to provide coverage and facilitate air-interface communication on one or more carriers according to a respective RAT. For instance, the 4G eNB 14 could provide 4G LTE coverage 18 on one or more 4G carriers, and the 5G eNB 16 could provide 5G NR coverage 20 on one or more 5G carriers. In an example implementation, coverage provided by the 4G eNB 14 could overlap at least partially with coverage provided by the 5G gNB 16, so that a UE could be served concurrently by both access nodes.

The 4G eNB 14 and 5G gNB 16 are each shown coupled with an example core network 22. Core network 22 could be an evolved packet core (EPC) network, a next generation core (NGC) network, or another network including components supporting an applicable radio access technology and providing connectivity with at least one transport network 24, such as the Internet. Alternatively, the access nodes could be coupled with different core networks.

In an example implementation as shown, the core network 22 includes a serving gateway (SGW) 26, a packet data network gateway (PGW) 28, a mobility management entity (MME) 30, a home subscriber server (HSS) 32, and an element management system (EMS) 34.

With this arrangement, the SGW 26 and PGW 28 could cooperatively define the core-network gateway system described above, to provide user-plane connectivity that enables a UE served by an access node to engage in communication on the transport network. Further, the MME 30 could operate as the core-network controller described above, to carry out operations such as coordinating UE attachment and setup and modification of user-plane bearers. And the HSS 32 could store UE profile records, which could specify service-subscription plans, UE configurations, and/ or UE capability information, such as whether a UE is EN-DC capable for instance. Further, the EMS 34 could operate as a central repository of operational data for the wireless communication network and to control and manage operation of various network elements.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided by the 4G eNB 14 on each 4G carrier could differ from the 5G air interface and 5G service provided by the 5G gNB 16 on each 5G carrier in various ways now known or later developed. For example, one may provide variable subcarrier spacing, but the other may provide fixed subcarrier spacing. As another example, one may have different subcarrier spacing and/or different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 also shows a representative UE 36 within coverage of both the 4G eNB 14 and the 5G gNB 16. UE 30 could be one of possibly many UEs in coverage of the cell site 12 at any given time.

In an example implementation, UE 34 supports 4G service, 5G service, and EN-DC service. For instance, the UE could include a 4G radio and associated RF circuitry for engaging in 4G service over a connection with 4G eNB 14 and a 5G radio and associated RF circuitry for engaging in 5G service over a connection with 5G gNB 16, and the UE could include control logic to enable the UE to engage in EN-DC service, operating concurrently with a 4G connection and a 5G connection.

When UE 34 enters into coverage of the 4G eNB 14, the UE could detect coverage of the 4G eNB 14 on a 4G carrier, and the UE could determine coverage strength from the 4G eNB 14 on that carrier, such as reference signal receive strength (RSRP) or reference signal receive quality (RSRQ), among other possibilities. If the UE determines that that coverage is sufficiently strong, the UE could then engage in random access signaling and RRC configuration signaling with the 4G eNB 14 as discussed above to establish a 4G connection with the 4G eNB 14 on the carrier, thus putting the UE in an RRC-connected mode. Further, the 4G eNB 14 could establish in data storage a context record for the UE and could store in the context record an identification of the UE's established 4G connection and an identification of the 4G carrier on which the UE is connected with the 4G eNB 14.

In addition, once the UE is connected with the 4G eNB 14, if the UE is not already attached with the core-network, the UE could then transmit to the 4G eNB 14 an attach request, which the 4G eNB 14 could forward to the MME 30 for processing. And after authenticating the UE, the MME 30 could then coordinate setup for the UE of one or more user-plane bearers. In line with the discussion above, for instance, for each such bearer, the MIME 30 could engage in signaling with the 4G eNB 14 and the SGW 26 to set up for the UE an S1-U tunnel between the 4G eNB 14 and the SGW 26. Further, the SGW 26 could responsively engage in signaling with the PGW 28 to set up for the UE an S5 tunnel between the SGW 26 and the PGW 28, and the 4G eNB 14 could engage in signaling with the UE to set up for the UE a DRB between the UE and the 4G eNB 14. And the 4G eNB 14 could record the operational state of the UE in the UE context record.

In relation to this attachment process, the 4G eNB 14 could also transmit to the UE an RRC message carrying a UE-capability enquiry, and the UE could respond to the 4G eNB 14 with a "UE capability information" information element (IE), which could indicate whether the UE is EN-DC capable. Alternatively, the 4G eNB 14 could receive such capability information from the MME 30, which could obtain the information from the HSS 32. The 4G eNB 14 could then store this UE capability data in a context record for reference while serving the UE.

Once the UE is connected and attached, the 4G eNB 14 could then provide the UE with standalone 4G service in the manner noted above.

For instance, when data arrives at the 4G eNB 14 for transmission to the UE, the 4G eNB 14 could allocate one or more downlink PRBs in a subframe on the UE's 4G connection, for use to transmit at least a portion of the data, defining a transport block, to the UE. The 4G eNB 14 could then transmit to the UE in the control region of that subframe on the UE's 4G connection a Downlink Control Information (DCI) message that designates the allocated PRBs, and the 4G eNB 14 could accordingly transmit the transport block to the UE in those designated PRBs on the UE's air interface connection.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the 4G eNB 14 a positive acknowledgement (ACK) control message, and the 4G eNB 14 could then proceed with transmission of a next transport block (if any) to the UE. Whereas, if the UE did not receive the transmission or determined that the CRC did not match and thus that there was an error in the received transport block, defining a block error, then the UE could transmit to the 4G eNB 14 a negative acknowledgement (NACK), in response to which the 4G eNB 14 could attempt the transmission again.

On the other hand, when the UE has data to transmit to the 4G eNB 14 (e.g., for transmission on the transport network), the UE could transmit to the 4G eNB 14 in the uplink control region of a subframe on the UE's 4G connection a scheduling request that carries with it a buffer status report (BSR) indicating how much data the UE has buffered for transmission to the 4G eNB 14. And in response, the 4G eNB 14 could allocate one or more uplink PRBs in an upcoming subframe on the UE's 4G connection for carrying a transport block of that data from the UE and could transmit to the UE on the UE's air-interface connection a DCI message that designates those upcoming PRBs. The UE could then accordingly transmit the transport block to the 4G eNB 14 in the designated PRBs on the UE's air-interface connection.

As with downlink transmission, for each transport block that the UE transmits to the 4G eNB 14, the 4G eNB 14 could determine if the transport block arrived successfully, based on a CRC analysis for instance. And if the 4G eNB 14 received the transmission successfully, then the 4G eNB 14 could transmit to the UE an ACK and could schedule a next uplink transmission from the UE. Whereas, if the 4G eNB 14 did not receive the transmission successfully, then the access node could transmit to the UE a NACK, and the UE could attempt retransmission to the 4G eNB 14.

In addition, once the UE is connected with the 4G eNB and is attached, if the UE is EN-DC capable, the 4G eNB 14 could then work to configure EN-DC service for the UE as noted above.

In line with the discussion above, for instance, the 4G eNB 14, operating as MN, could first transmit to the UE (e.g., in an RRC message) a B1 measurement object that directs the UE to scan for coverage of the 5G gNB 16, e.g., on one or more carriers on which the 5G gNB 16 operates, and that designates at least one B1 measurement threshold. The B1 measurement threshold could be a minimum threshold level of reference signal receive power (RSRP) and/or reference signal receive quality (RSRQ) that the UE has from the 5G gNB 16 as a condition for the UE providing a B1 measurement report to the 4G eNB 14. For instance, the B1 measurement threshold could be RSRP on the order of at least −116 dBm to −95 dBm.

Upon receipt from the UE of a B1 measurement report indicating that the UE is within threshold strong enough coverage of the 5G gNB 16, the 4G eNB 14 could then engage in process to add the 5G gNB 16 as an SgNB for the UE. For instance, the 4G eNB 14 could transmit to the 5G gNB 16 an SgNB-Addition request to cause the 5G gNB to allocate resources for a 5G connection for the UE on one or more 5G carriers, receive an SgNB-Addition-Request acknowledge message from the 5G gNB 16, and engage in associated RRC signaling with the UE, in response to which the UE could then access and complete establishment of the 5G connection.

Further, as part of the SgNB-addition process, the 4G eNB 14 could engage in signaling as described above with respect to at least one user-plane bearer established for the UE, to transfer to bearer's S1-U tunnel from extending between the SGW 26 and the 4G eNB 14 to instead extend between the SGW 26 and the 5G gNB 16. For instance, as discussed above, the 4G eNB 14 could transmit to the MME 30 a RAB-modification request that requests that transfer, and the MME 30 could responsively engage in signaling to coordinate the transfer.

With EN-DC configured for the UE, the 4G eNB 14 and 5G gNB 16 could then concurrently serve the UE over their respective connections with the UE, each in the manner noted above for instance. That is, the 4G eNB 14 could continue to serve the UE over the UE's 4G connection as discussed above, and the 5G gNB 16 could do the same over the UE's 5G connection.

Thus, as each access node receives data for transmission to the UE, the access node could schedule and provide transmission of the data to the UE on the UE's air-interface connection with the access node, the UE could transmit ACK/NACK messaging to the access node based on CRC analyses or the like, and the access node could retransmit to the UE when appropriate. And as the UE has data to transmit to an access node, the access node could schedule transmission of the data from the UE on the UE's air-interface connection with the access node and the UE could provide the transmission accordingly, the access node could transmit ACK/NAK messaging to the UE based on CRC analyses or the like, and the UE could retransmit to the access node when appropriate.

When the UE is so served with EN-DC by the 4G eNB 14 and the 5G gNB 16, the 4G eNB 14—as the MN—could also monitor to determine when quality of communication between the UE and the 5G gNB 16 becomes threshold poor. And when the 4G eNB 14 detects that quality of communication on the UE's 5G connection with the 5G gNB 16 becomes threshold poor, the 4G eNB 14 could responsively de-configure the UE's EN-DC service, transitioning the UE from EN-DC back to standalone 4G connectivity as noted above.

The 4G eNB 14 could detect the threshold poor quality of communication on the UE's 5G connection in various ways, considering downlink quality and/or uplink quality, and considering one or more metrics, such signal strength, signal-to-noise ratio, extent of retransmissions, noise level, packet error rate, block error rate, bit error rate, power headroom, and/or others now known or later developed.

Without limitation, for instance, the 4G eNB 14 could determine when there has been a threshold high block error rate (BLER) of communications between the UE and the 5G gNB 16 and or a threshold high rate of re-transmissions of communications between the UE and the 5G gNB 16. For instance, as the 5G gNB 16 serves the UE, the UE and/or 5G gNB 16 could keep track of the rate of block errors and/or retransmissions for communications between the UE and the 5G gNB 16, over a sliding window of time. When the rate of block errors and/or retransmissions becomes at least as high as a predefined high threshold level, the UE and/or 5G gNB could then transmit an associated report to the 4G eNB 14. For example, the UE could transmit this report over the UE's 4G connection to the 4G eNB 14, and/or the 5G gNB 16 could transmit this report over an X2 interface to the 4G eNB 14.

Alternatively or additionally, 4G eNB 14 could provide the UE with a measurement directive for the UE to determine and report when the UE's coverage from the 5G gNB 16 becomes threshold weak, such as when the UE detects RSRP or RSRQ that is below a specified threshold level. When the UE detects such threshold poor coverage from the 5G gNB 16, the UE could thus transmit an associated measurement report to the 4G eNB 14 to indicate that fact. And still alternatively or additionally, the 5G gNB 16 could detect threshold weak received signal strength from the UE and could report that fact over an X2 interface to the 4G eNB 14. Other examples could be possible as well.

In response to detecting the threshold poor quality of communication on the UE's 5G connection, the 4G eNB 14 could then de-configure the UE's EN-DC service by reversing the EN-DC-setup process discussed above. For instance, the 4G eNB 14 could engage in signaling with the 5G gNB 16 and with the UE to release the UE's 5G connection. Further, the 4G eNB 14 could transmit to the MIME 30 a RAB-modification request that requests transfer of the UE's S1-U from the 5G gNB 16 back to the 4G eNB 14. And the 4G eNB 14 could then proceed to provide the UE once again with standalone 4G service.

In line with the discussion above, the present disclosure could involve monitoring the rate of RAB-modification requests that request transfer of the UE's bearer between the 4G eNB 14 and the 5G gNB 16 and, in response to detecting that the rate of RAB-modification requests is threshold high, causing the 4G eNB 14 to discontinue transmitting such RAB-modification requests to the MIME 30.

Also in line with the discussion above, various entities could carry out this process.

By way of example, the MME 30 could carry out this process by keeping track of the rate of its receipt of such RAB-modification requests from the 4G eNB 14 for an S1-UE tunnel of the UE and, upon detecting that that rate is threshold high, then transmitting to the 4G eNB 14 a signaling message to which the 4G eNB 14 is configured to respond by discontinuing transmitting to the MME further such RAB-modification requests for the UE's S1-UE tunnel.

As another example, the EMS 14 could carry out the process. For instance, each time the 4G eNB 14 transmits to the MME 30 a RAB-modification request requesting transfer of the UE's S1-U tunnel between the 4G eNB 14 and the 5G gNB 16, the 4G eNB 14 and/or MME could report that request to the EMS. The EMS could thus track such requests, detect when the rate of such requests becomes threshold high, and responsively transmit to the 4G eNB 14 a signaling message to which the 4G eNB 14 is configured to respond by discontinuing transmitting to the MME further such RAB-modification requests for the UE's S1-U tunnel.

And as still another example, the 4G eNB 14 itself could carry out the process. For instance, the 4G eNB 14 could keep track of the rate of its transmitting to the MME such RAB-modification requests for an S1-U tunnel of the UE and, upon detecting that that rate is threshold high, then setting itself to discontinue transmitting to the MME further such RAB-modification requests for the UE's S1-U tunnel.

The act of the 4G eNB 14 discontinuing its transmission to the MME of further such RAB-modification requests could involve the 4G eNB 14 configuring an internal setting, such as a note in the UE's context record, according to which the 4G eNB 14 would not send to the MME further RAB-modification requests requesting transfer of the UE's S1-U tunnel between the 4G eNB 14 and the 5G gNB 16. In practice, this could result in the UE staying with EN-DC configured or staying with 4G-only standalone service, so as to avoid further ping-ponging. Further, this could occur after the 4G eNB 14 optionally sends to the MME one final such RAB-modification request to put the UE in the desired state of connectivity.

As also noted above, the discontinuing of the 4G eNB 14 transmitting further such RAB-modification requests to the MME could be temporary. First, the discontinuation could be just for as long as the UE's S1-U tunnel exists with any access node as an anchor, so the discontinuation could end once the UE detaches and/or otherwise loses that tunnel. Second, the discontinuation could be kept for a defined time period. For instance, the 4G eNB 14 could set and apply a timer for a period of time, such as a number of seconds or minutes deemed sufficient for this purpose, and could avoid transmitting further such RAB-modification requests while that timer runs. In response to expiration of the timer, the 4G eNB 14 could then revert to a mode of operation in which the 4G eNB 14 would sent such RAB-modification requests when appropriate as discussed above. Other examples could also be possible.

Note also that the above process could also work with multiple SNs such as multiple 5G gNBs. In that scenario, for instance, the UE might transition from standalone 4G service provided by the 4G eNB 14 to EN-DC service provided by the 4G eNB 14 and one of the 5G gNBs and might then transition back to standalone 4G service provided by the 4G eNB 14, and the UE might then transition from the standalone 4G service provided by the 4G eNB 14 to EN-DC service provided by the 4G eNB 14 and another one of the 5G gNBs and might then transition again back to standalone 4G service provided by the 4G eNB 14, and so forth. And for each such transition, the 4G eNB might send a RAB-modification request to the MME. In that case, the threshold high rate of RAB-modification requests could encompass such requests for transferring the UE's S1-U tunnel to and from the 4G eNB 12, even though the transfers may be with respect to various different 5G gNBs.

Further, note that the threshold high rate of RAB-modification requests requesting transfer of the UE's S1-U tunnel to and from the 4G eNB 14 could be set at a level that is deemed problematic from an engineering design and operation standpoint. Without limitation, for instance, the threshold might be set to a rate on the order of 50 to 100 such requests per second or perhaps a value less excessive such as 10 to 30 such requests per minutes. Numerous other examples could be possible as well.

Still further, while the above discussion focuses on the rate of RAB-modification requests requesting transfer of a given S1-U tunnel of the UE to or from the 4G eNB 14, at issue could be more generally when the rate of RAB-modification requests requesting transfer of a RAB of the UE to and from the 4G eNB 14 becomes at least predefined threshold high. Each such RAB transfer could be a transfer of one or another S1-U tunnel of the UE from the 4G eNB 14 to a 5G gNB or a transfer of one or another S1-U tunnel of the UE from a 5G gNB 16 to the 4G eNB 14, or could take other forms.

Figure 2:
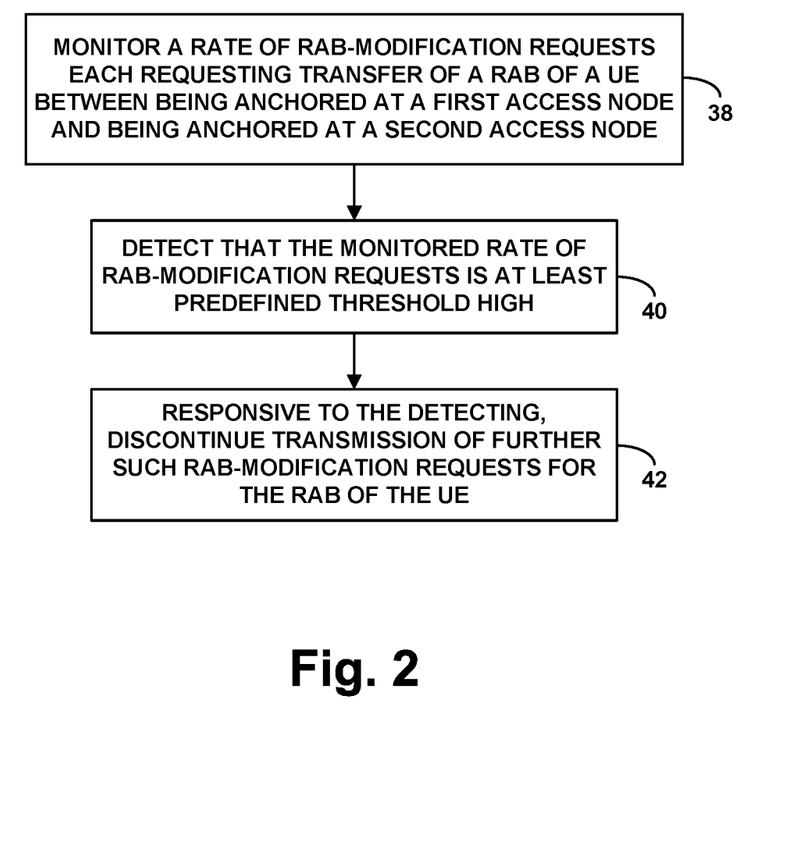
FIG. 2 is a flow chart depicting an example method in accordance with the disclosure.

FIG. 2 is a flow chart depicting a method operable in a wireless communication system when a UE is connected with and served by a first access node. This method could be carried out by a computing system, which could be provided at entity as noted above, while the UE remains connected with and served by the first access node (i.e., not as part of handover from that first access node). As shown in FIG. 2, at block 38, the method includes monitoring a rate of RAB-modification requests each requesting transfer of a RAB of the UE between being anchored at the first access node and being anchored at a second access node. Further, at block 40, the method includes detecting that the monitored rate of RAB-modification requests is at least predefined threshold high. And at block 42, the method includes, responsive to the detecting, discontinuing transmission of further such RAB-modification requests for the RAB of the UE.

In line with the discussion above, in this method, each RAB-modification request could request transfer of an S1-U tunnel of the UE. In particular, each transfer of a RAB of the UE between being anchored at the first access node and being anchored at a second access node could involve a transfer of an S1-U tunnel of the UE between (i) extending between a core-network gateway and the first access node and (ii) extending between the core-network gateway and a second access node.

In addition, as discussed above, each RAB-modification request that requests transfer of the RAB of the UE from being anchored at the first access node to being anchored at the second access node could be part of configuring dual-connectivity service for the UE to be served concurrently by the first access node and the second access node. And each RAB-modification request that requests transfer of the RAB of the UE from being anchored at the second access node to being anchored at the first access node could be part of de-configuring the dual-connectivity service.

Further, as discussed above, the method could be carried out while the UE has a first air-interface connection between the UE and the first access node in accordance with a first RAT, in which case the act of configuring dual-connectivity service for the UE could include configuring for the UE a second air-interface connection between the UE and the second access node according to a second RAT. And as noted above, the first RAT could be 4G LTE, the second RAT could be 5G NR, and the dual-connectivity service could be EN-DC.

As additionally discussed above, each RAB-modification request could be transmitted from the first access node to a core-network controller and could trigger further signaling to effect the requested transfer of the RAB. And in that case, the method could be carried out at least by the core-network controller. In particular, the act of monitoring the rate of RAB-modification requests could involve the core-network controller monitoring a rate of receipt by the core-network controller of the RAB-modification requests. And the act of discontinuing transmission of further such RAB-modification requests for the RAB of the UE could involve the core-network controller transmitting to the first access node a signaling message to which the first access node is configured to respond by discontinuing transmission of further such RAB-modification requests for the RAB of the UE.

Alternatively, as noted above, the method could be carried out by another entity, such as by an EMS, in which case that other entity could monitor the rate based on reports of the RAB-modification requests, and the act of discontinuing transmission of further such RAB-modification requests for the RAB of the UE could involve the entity transmitting to the first access node a signaling message to which the first access node is configured to respond by discontinuing transmission of further such RAB-modification requests for the RAB of the UE.

Still further, as discussed above, the act of detecting that the monitored rate of RAB-modification requests is at least predefined threshold high could involve comparing the monitored rate to a predefined threshold to determine whether the monitored rate is at least as high as the predefined threshold.

Figure 3:
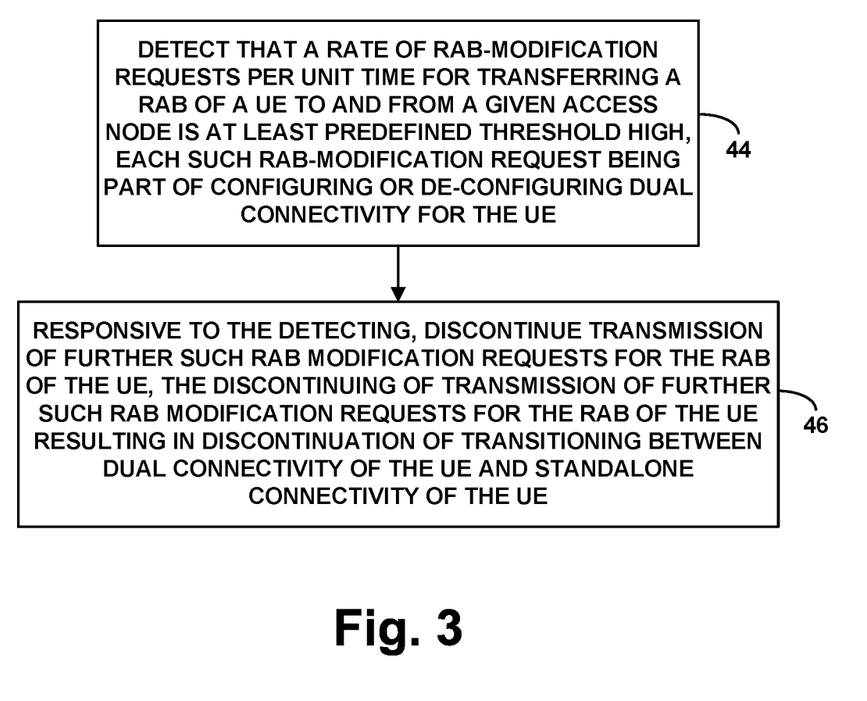
FIG. 3 is another flow chart depicting an example method in accordance with the disclosure.

FIG. 3 is next another flow chart depicting a method operable in a wireless communication system when a UE is connected with and served by a first access node. As noted above, this method could likewise be carried out by a computing system. As shown in FIG. 3, at block 44, the method includes detecting that a rate of RAB-modification requests per unit time for transferring a RAB of the UE to and from a given access node is at least predefined threshold high, where each such RAB-modification request is part of configuring or de-configuring dual connectivity for the UE. And at block 46, the method includes, responsive to the detecting, discontinuing transmission of further such RAB modification requests for the RAB of the UE, where the discontinuing of transmission of further such RAB modification requests for the RAB of the UE results in discontinuation of transitioning between dual connectivity of the UE and standalone connectivity of the UE.

Figure 4:
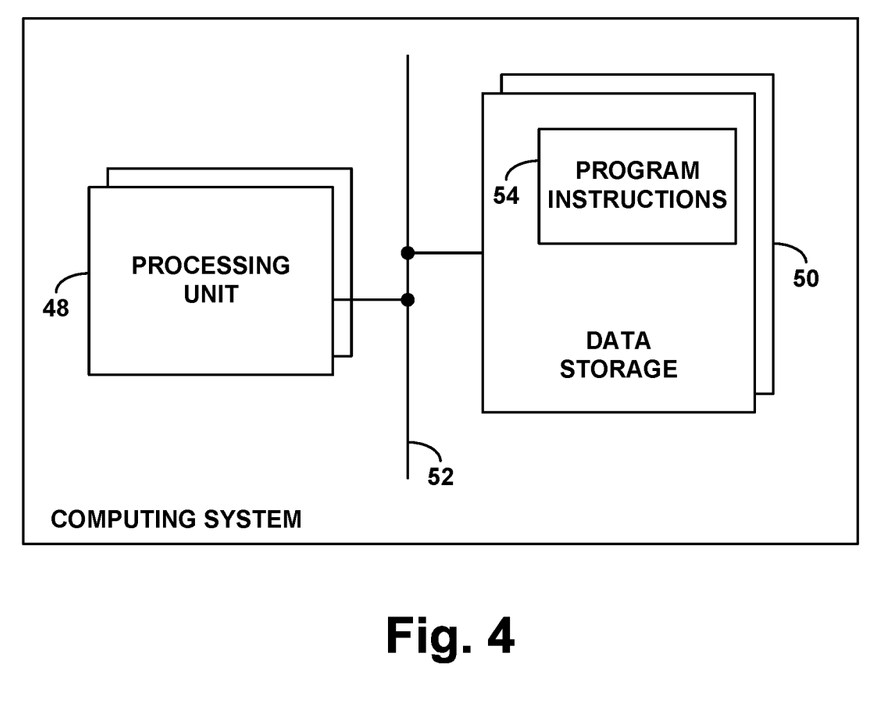
FIG. 4 is a simplified block diagram of a computing system operable in accordance with the disclosure.

FIG. 4 is next a simplified block diagram of a computing system that could carry out various features as described above. As noted above, this computing system could be provided at various entities, such as an MME, EMS, or the first access node, among other possibilities. As shown in FIG. 4, the computing system includes at least one processing unit 48 and at least tone non-transitory data storage 50, which could be integrated or communicatively linked together by a system bus, network, or other connection mechanism 52.

The at least one processing unit 48 could comprise one or more processors, such as one or more microprocessors or specialized processors. And the at least one non-transitory data storage 50 could comprise on or more volatile and/or non-volatile storage components, such as magnetic, optical, or flash storage media. An as further shown, the at least one data storage 50 could hold, store, encode, or otherwise embody program instructions 54. In a representative implementation, those program instructions 54 could be executable by the at least one processing unit 48 to carry out various features described herein.

The present disclosure also contemplates a computer readable medium having stored thereon (e.g., encoded with) program instructions executable by a processing unit to carry out various operations described above.

Exemplary embodiments have been described above. Those skilled in the art will understand, however, that changes and modifications may be made to these embodiments without departing from the true scope and spirit of the invention.

We claim:

1. A method operable in a wireless communication system when a user equipment device (UE) is connected with and served by a first access node, the method comprising:
while the UE remains connected with and served by the first access node, (i) monitoring a rate of radio-access-bearer (RAB) transfer requests each requesting transfer of a RAB of the UE between being anchored at the first access node and being anchored at a second access node, (ii) detecting that the monitored rate of RAB-transfer requests is at least predefined threshold high, and (iii) responsive to the detecting, discontinuing transmission of further such RAB-transfer requests for the RAB of the UE,
wherein each RAB-transfer request that requests transfer of the RAB of the UE from being anchored at the first access node to being anchored at the second access node is part of configuring dual-connectivity service for the UE to be served concurrently by the first access node and the second access node, and
wherein each RAB-transfer request that requests transfer of the RAB of the UE from being anchored at the second access node to being anchored at the first access node is part of de-configuring the dual-connectivity service.

2. The method of claim 1, wherein each transfer of the RAB of the UE between being anchored at the first access node and being anchored at the second access node comprises a transfer of an S1-U tunnel of the UE between (i) extending between a core-network gateway and the first access node and (ii) extending between the core-network gateway and the second access node.

3. The method of claim 1, wherein the method is carried out while the UE has a first air-interface connection between the UE and the first access node in accordance with a first radio access technology (RAT), wherein configuring dual-connectivity service for the UE includes configuring for the UE a second air-interface connection between the UE and the second access node according to a second RAT.

4. The method of claim 3, wherein the first RAT is 4G Long Term Evolution (4G LTE), wherein the second RAT is 5G New Radio (5G NR), and wherein the dual-connectivity service is EUTRA-NR Dual Connectivity (EN-DC) service.

5. The method of claim 1, wherein each RAB-transfer request is transmitted from the first access node to a core-network controller and triggers further signaling to effect the requested transfer of the RAB.

6. The method of claim 5, wherein the method is carried out at least by the core-network controller,
wherein monitoring the rate of RAB-transfer requests comprises the core-network controller monitoring a rate of receipt by the core-network controller of the RAB-transfer requests, and
wherein discontinuing transmission of further such RAB-transfer requests for the RAB of the UE comprises the core-network controller transmitting to the first access node a signaling message to which the first access node is configured to respond by discontinuing transmission of further such RAB-transfer requests for the RAB of the UE.

7. The method of claim 1, wherein the method is carried out at least by an element management system,
wherein monitoring the rate of RAB-transfer requests comprises the element management system monitoring the rate based on reports of the RAB-transfer requests, and
wherein discontinuing transmission of further such RAB-transfer requests for the RAB of the UE comprises the element management system transmitting to the first access node a signaling message to which the first access node is configured to respond by discontinuing transmission of further such RAB-transfer requests for the RAB of the UE.

8. The method of claim 1, wherein detecting that the monitored rate of RAB-transfer requests is at least predefined threshold high comprises comparing the monitored rate to a predefined threshold to determine whether the monitored rate is at least as high as the predefined threshold.

9. The method of claim 1, wherein each RAB-transfer request requests transfer of an S1-U tunnel of the UE.

10. A method operable in a wireless communication system when a user equipment device (UE) is connected with and served by a first access node, the method comprising:
detecting that a rate of radio-access-bearer (RAB) transfer requests per unit time for transferring a RAB of the UE to and from a given access node is at least predefined threshold high, wherein each such RAB-transfer request is part of configuring or de-configuring dual connectivity for the UE; and responsive to the detecting, discontinuing transmission of further such RAB-transfer requests for the RAB of the UE while the UE remains connected with and served by the first access node, wherein the discontinuing of transmission of further such RAB-transfer requests for the RAB of the UE results in discontinuation of transitioning between dual connectivity of the UE and standalone connectivity of the UE.

11. The method of claim 10, wherein each RAB-transfer request is for transferring the RAB of the UE between being anchored at the first access node and being anchored at a second access node.

12. The method of claim 11, wherein transferring the RAB of the UE between the first access node and the second access node comprises transferring a tunnel of the UE between (i) extending between a core-network gateway and the first access node and (ii) extending between the core-network gateway and the second access node.

13. The method of claim 10, wherein the method is carried out while the UE has first air-interface connectivity between the UE and the first access node in accordance with a first radio access technology (RAT), wherein configuring dual-connectivity for the UE includes configuring for the UE second air-interface connectivity between the UE and a second access node according to a second RAT, and wherein de-configuring dual connectivity for the UE includes releasing second air-interface connectivity between the UE and the second access node.

14. The method of claim 10, wherein each RAB-transfer request is transmitted from the first access node to a core-network controller and triggers further signaling to effect the requested transfer of the RAB.

15. A computing system comprising:
at least one processing unit;
at least one non-transitory data storage; and
program instructions stored in the at least one non-transitory data storage and executable by the at least one processing unit to carry out operations when a user equipment device (UE) is connected with and served by a first access node, the operations including, while the UE remains connected with and served by the first access node:
monitoring a rate of radio-access-bearer (RAB) transfer requests each requesting transfer of a RAB of the UE between being anchored at the first access node and being anchored at a second access node,
detecting that the monitored rate of RAB-transfer requests is at least predefined threshold high, and responsive to the detecting, discontinuing transmission of further such RAB-transfer requests for the RAB of the UE,
wherein each RAB-transfer request that requests transfer of the RAB of the UE from being anchored at the first access node to being anchored at the second access node is part of configuring dual-connectivity service for the UE to be served concurrently by the first access node and the second access node, and
wherein each RAB-transfer request that requests transfer of the RAB of the UE from being anchored at the second access node to being anchored at the first access node is part of de-configuring the dual-connectivity service.

16. The computing system of claim 15, wherein each transfer of the RAB of the UE between being anchored at the first access node and being anchored at the second access node comprises a transfer of an S1-U tunnel of the UE between (i) extending between a core-network gateway and the first access node and (ii) extending between the core-network gateway and the second access node.

17. The computing system of claim 15, wherein the operations are carried out while the UE has a first air-interface connection between the UE and the first access node in accordance with a first radio access technology (RAT), wherein configuring dual-connectivity service for the UE includes configuring for the UE a second air-interface connection between the UE and the second access node according to a second RAT.

18. The computing system of claim 17, wherein the first RAT is 4G Long Term Evolution (4G LTE), wherein the second RAT is 5G New Radio (5G NR), and wherein the dual-connectivity service is EUTRA-NR Dual Connectivity (EN-DC) service.

19. The computing system of claim 15, wherein each RAB-transfer request is transmitted from the first access node to a core-network controller and triggers further signaling to effect the requested transfer of the RAB.

20. The computing system of claim 19, wherein the computing system is disposed at the core-network controller,
wherein monitoring the rate of RAB-transfer requests comprises the core-network controller monitoring a rate of receipt by the core-network controller of the RAB-transfer requests, and
wherein discontinuing transmission of further such RAB-transfer requests for the RAB of the UE comprises the core-network controller transmitting to the first access node a signaling message to which the first access node is configured to respond by discontinuing transmission of further such RAB-transfer requests for the RAB of the UE.

* * * * *